(12) United States Patent
Nagasaka

(10) Patent No.: US 7,324,872 B2
(45) Date of Patent: Jan. 29, 2008

(54) ROBOT APPARATUS

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/490,759

(22) Filed: Jul. 21, 2006

(65) Prior Publication Data
US 2007/0021870 A1    Jan. 25, 2007

(30) Foreign Application Priority Data
Jul. 22, 2005    (JP)    ............................ 2005-212629

(51) Int. Cl.
G06F 19/00    (2006.01)

(52) U.S. Cl. ...................... 700/245; 700/247; 700/248; 700/249; 700/258; 700/260; 318/568.1; 318/568.11; 318/568.12; 318/568.16; 318/568.21; 318/568.22; 318/568.24; 318/568.25; 318/611; 901/1; 901/9; 901/10; 901/16; 901/25; 901/42; 901/47

(58) Field of Classification Search ................ 700/245, 700/247, 248, 249, 258, 260; 318/568.1, 318/568.11, 568.12, 568.16, 568.21, 568.22, 318/568.24, 568.25, 611; 219/124.34, 125.1; 29/711, 783, 784; 901/1, 9, 10, 16, 25, 42, 901/47

See application file for complete search history.

(56) References Cited

U.S. PATENT DOCUMENTS

| | | | | |
|---|---|---|---|---|
| 5,838,130 | A * | 11/1998 | Ozawa ..................... | 318/568.2 |
| 5,872,893 | A * | 2/1999 | Takenaka et al. ........... | 700/245 |
| 6,064,168 | A * | 5/2000 | Tao et al. ............... | 318/568.21 |
| 6,243,623 | B1 * | 6/2001 | Takenaka et al. ........... | 700/245 |
| 6,289,265 | B1 * | 9/2001 | Takenaka et al. ........... | 700/245 |
| 6,463,356 | B1 * | 10/2002 | Hattori et al. .............. | 700/245 |
| 6,493,606 | B2 * | 12/2002 | Saijo et al. ................. | 700/245 |
| 6,580,969 | B1 * | 6/2003 | Ishida et al. ................ | 700/245 |
| 6,584,377 | B2 * | 6/2003 | Saijo et al. ................. | 700/245 |
| 6,992,455 | B2 * | 1/2006 | Kato et al. ............. | 318/568.12 |
| 7,053,577 | B2 * | 5/2006 | Nagasaka .............. | 318/568.12 |

FOREIGN PATENT DOCUMENTS

| | | |
|---|---|---|
| JP | 8 338341 | 12/1996 |
| JP | 10 175180 | 6/1998 |
| JP | 2004 167676 | 6/2004 |

OTHER PUBLICATIONS

Verdonck et al., Combining internal and external robot models to improve model parameter estimation, 2001, IEEE, p. 2864-2851.*
Lee et al., A perturbation/Correlation method for force guided robot assembly, 1999, IEEE, p. 764-773.*
Kazuhiro Kosuge et al., "Decentralized Control of Multiple Mobile Robots Handling a Single Object in Coordination" vol. 16, No. 1, p. 87, 1998.
Hiroyuki Shinoda, "Tactile Sensing for Dexterous Hand", vol. 18, No. 6, pp. 8-13, 2000.

* cited by examiner

*Primary Examiner*—Thomas Black
*Assistant Examiner*—McDieunel Marc
(74) *Attorney, Agent, or Firm*—Frommer Lawrence & Haug LLP; William S. Frommer; Thomas F. Presson

(57) ABSTRACT

An external force estimation system for estimating an external force acting upon a robot apparatus which includes a machine body which in turn includes a plurality of movable joints is disclosed which includes a distribution type contacting state detection section, an actuator current state measurement section, a motion state measurement section, a motion equation setting section, a known term calculation section, and an external force estimation section.

35 Claims, 8 Drawing Sheets

ALTHOUGH IT IS FOUND THAT SOME PORTION IN CONVEX REGION CONTACTS, ACCURATE POSITION, DIRECTION AND MAGNITUDE ARE NOT KNOWN.

ROBOT APPARATUS

CROSS REFERENCES TO RELATED APPLICATIONS

The present invention contains subject matter related to Japanese Patent Application JP 2005-212629 filed in the Japanese Patent Office on Jul. 22, 2005, the entire contents of which being incorporated herein by reference.

BACKGROUND OF THE INVENTION

1. Field of the Invention

This invention relates to a robot apparatus having a plurality of joint degrees of freedom, and particularly to a robot apparatus which includes a moving mechanism such as movable legs.

More particularly, the present invention relates to a robot apparatus which autonomously moves on the ground to perform positive and various physical interactions with a human being or an object, and more specifically to a robot apparatus which grasps a contacting state with the external field or a situation in which a force acts when the robot apparatus performs a physical interaction with a human being or an object.

2. Description of the Related Art

Research and development regarding the structure or stabilized walking control of a legged mobile robot have proceeded recently and also the expectation for practical use of a legged mobile robot is increasing. The legged mobile robot is less stable and more difficult in posture control and walking control than a crawler type robot. However, the legged mobile robot is superior in that flexible walking or running motion such as an ascending or descending motion on a staircase or a getting over motion of an obstacle can be implemented.

A robot in the past is applied principally to substitutive execution or supporting of various human works in industrial activities or production activities as represented by a six-axis manipulator. The robot in this instance presupposes that it acts in a structured environment such as a factory, and hence does not basically perform complicated physical interactions with a human being or an environment.

In contrast, attention is paid recently to an application of a robot as an application of the partner type, that is, an application to "symbiosis" with a human being or to "entertainment." Such a robot as this type is desired to have an advanced ability to perform interactions with not only an object or an environment but also a human being.

A robot of the partner type is not fixed at a predetermined place like a six-axis manipulator but is normally formed as a mobile robot which autonomously moves to provide various services. A representative one of such partner type robots is a humanoid. A robot apparatus has been proposed and disclosed, for example, in Japanese Patent Laid-Open No. 2004-167676 (hereinafter referred to as Patent Document 1) which includes a moving mechanism and can produce a stable motion pattern for transition between grounding and non-grounding stages on the real time basis.

Most of partner type robots are not always used in such a manner that the posture is fixed. As occasion demands, a great variation in posture occurs with a robot of the type described such that it rolls about on the floor or falls down. Further, the robot interacts with an external world in various modes such as contact of the feet with the ground upon walking or handling of a tool with the hands. In other words, a portion of the robot at which the robot interacts with the external world is not limited particularly, and the robot contacts at an arbitrary portion of the machine body thereof with the external world.

In this manner, to a robot which performs positive and various physical interactions with a human being or an object, it is very important to grasp a contacting state with the external world or an acting situation of a force, that is, an external force applied to an arbitrary portion of the robot.

An external force acting upon a robot is detected normally by such a method that a force sensor represented by a six-axis force sensor or the like is disposed at a pertaining location so that an external force is detected directly by the force sensor.

A foot bottom grounding position detection apparatus for a leg type mobile robot is disclosed in Japanese Patent Laid-Open No. Hei 10-175180 (hereinafter referred to as Patent Document 2) wherein a six-axis force sensor is attached to an ankle and a point of action of a force and the acting force acting upon the bottom of the foot are detected. In the robot of Patent Document 2, a force sensor is provided at a portion above a foot platy portion of the robot. When the robot moves up and down on a staircase, a force component $F_z$ in a Z direction perpendicular to the foot platy portion, a force component $F_x$ in an X-axis direction which is a forward and backward direction, and a moment $M_y$ around an axis in a Y-axis direction which is a leftward and rightward direction, are detected. Then, the position x of the center of the reaction force from the floor which acts on the sole is detected successively from the detected forces. Then, from the detected value of the force component $F_z$, the floor contacting starting time and the floor leaving finish time of the sole are detected, and the floor contacting starting grounding position and the floor leaving finish grounding position of the sole are determined from the position x determined within a range of time near the detection times.

However, with a robot of the type described, only a force applied to an end of the foot platy portion can be measured by the force sensor. Further, also where the robot has a plurality of points of action of force on the distal end side with respect to the force sensor, only a resultant force of the forces can be detected. Therefore, it is hard to specify the places of the individual points of action accurately, and determine the forces acting upon the individual points of action independently of each other.

Further, various proposals have been made for a method of specifying a portion of the body of a robot at which the body contacts with the external world by detecting a variation of electric signals from contact sensors or on/off switches attached to the overall area of the surface of the robot and made of a material whose resistance value or electrostatic capacitance varies in response to the pressure applied thereto. Such proposals are disclosed, for example, in "Development and Applications of Multivalued Touch Sensor That Cover Robots," proceedings of the Robotics and Mechatronics Conference 1998 of The Japan Society of Mechanical Engineers, 1CI1-2, 1998 (hereinafter referred to as Non-Patent Document 1), "Development and Applications of Soft Tactile Sensor Made of Conductive," proceedings of the 16th Annual Conference of the Robotics Society of Japan, pp.873 to 874, 1998 (hereinafter referred to as Non-Patent Document 2), or "A Full-Body Tactile Sensor Suit Using Electrically Conductive Fabric," Journal of the Robotics Society of Japan, Vol. 16, No. 1, pp.80 to 86, 1998 (hereinafter referred to as Non-Patent Document 3).

However, a sensor of the type described is very low in accuracy when compared with general force sensors such as a six-axis force sensor and basically allows acquisition only of on/off information, that is, information regarding whether or not there exists contact with the external world. In other words, although the sensor of the type described can specify a contacting portion, it cannot detect a force acting upon the portion. Further, only if a detected value of the sensor is basically used as it is, information regarding the force acting upon the contacting portion cannot be obtained and the sensor value cannot be utilized for dynamic control of the entire robot.

Further, a more abundant contacting state with the external world can be obtained by raising the accuracy of force information which can be acquired by a distribution type tactile sensor as disclosed, for example, in "Tactile Sensing for Dexterous Hand," Journal of the Robotics Society of Japan, Vol. 18, No. 6, pp.767 to 771, 2000 (hereinafter referred to as Non-Patent Document 4). However, according to the technical level at the point of time at which the present patent application is filed in Japan, a small-size sensor by which a frictional force and a normal reaction force can be acquired with a high degree of accuracy and which can be distributed to and disposed on the whole body of a robot has not been placed into practical use. Further, even if such a sensor as just described can be implemented in the future, since the amount of information of sensor values to be inputted is very great, there is the possibility that processing of such data or implementation of a data transmission method may be difficult or a result of increase of the cost of the system may be invited.

SUMMARY OF THE INVENTION

Therefore, it is desirable to provide a superior robot apparatus which includes a moving mechanism such as movable legs and can move autonomously on the ground and positively physically interact in various manners with a human being or an object.

Also it is desirable to provide a superior robot apparatus which can physically interact with a human being or an object and suitably grasp a contacting state with the external world and an acting situation of a force.

Further, it is desirable to provide a superior robot apparatus which can physically interact with a human being or an object and can specify a portion at which the robot apparatus contacts with the external world and estimate the force acting upon the contacting portion to suitably control the dynamics of the entire robot.

Furthermore, it is desirable to provide a superior robot wherein distribution type tactile sensors are disposed on the whole body or at necessary places and an external force applied to a portion at which the robot apparatus contacts with the external world can be estimated suitably from a combination of outputs of the sensors and the body dynamics.

According to an embodiment of the present invention, there is provided an external force estimation system for estimating an external force acting upon a robot apparatus which includes a machine body which in turn includes a plurality of movable joints, including distribution type contacting state detection means configured to detect a contacting state of an arbitrary portion of the machine body with the external world, actuator current state measurement means configured to measure a position, a speed and a generation force at present of each of the joint actuators, motion state measurement means configured to measure an acceleration and an angular speed at least at one portion of the machine body, motion equation setting means configured to set a motion equation of the robot apparatus, known term calculation means configured to calculate a known term of the motion equation from the current states of the joint actuators obtained from the actuator current state measurement means and the current state of the robot apparatus obtained from the motion state measurement means, and external force estimation means configured to estimate an acting state of the external force as an unknown term of the motion equation.

In the present specification, the term "system" is used to represent a logically set apparatus composed of a plurality of apparatus (or a plurality of functional modules which implement a particular function), which may be included in the same housing or may be provided discretely.

To a robot which performs positive and various physical interactions with a human being or an object, it is very important to grasp a contacting state with the external world or an acting situation of a force, that is, an external force applied to an arbitrary portion of the robot.

An external force acting upon a robot is detected normally by such a method that a force sensor represented by a six-axis force sensor or the like is disposed at a pertaining location so that an external force is detected directly by the force sensor. However, with the method just described, a force applied to the portion at which the force sensor is installed cannot be measured directly by the force sensor. Further, also where the robot has a plurality of points of action of force on the distal end side with respect to the force sensor, only a resultant force of the forces can be detected. Therefore, the places of the individual points of action cannot be specified accurately, and the forces acting upon the individual points of action cannot be determined independently of each other. Further, it is not realistic to dispose a number of expensive force sensors in a high density over the overall machine body of a robot.

On the other hand, if contact sensors or on/off switches made of a material whose resistance value or electrostatic capacitance varies in response to a pressure applied thereto are attached to the overall area of the surface of a robot and a variation of electric signals from the contact sensors or on/off switches is detected, then a portion of the machine body of the robot at which the machine body contacts with the external world can be specified. However, this basically allows acquisition only of on/off information, that is, information regarding whether or not contact with the external world exists. Thus, even if a contacting portion can be specified, the force acting upon the contacting portion cannot be detected.

In contrast, in the external force estimation system according to the embodiment of the present invention, on/off information obtained from various portions of the robot wherein a contact sensor which can acquire on/off information is disposed at an arbitrary place of the machine body is combined with some other physical quantity such as the dynamics of the entire machine body of the robot, a joint force state and a motion state of the entire robot. Consequently, a force acting upon the contact sensor portion can be estimated.

In the external force estimation system, a motion equation of the robot apparatus is set at a predetermined place of the machine body. Further, the known term calculation means may determine an operation space inertia inverse matrix and a bias acceleration by dynamics arithmetic operation in an operation space to calculate a known term of the motion equation. Then, the external force estimation means may estimate the acting state of the external force such that a relationship which satisfies the motion equation is established between the operation space inertial inverse matrix and the bias acceleration.

The known term calculation means may perform the operation space dynamics arithmetic operation using forward dynamics arithmetic operation.

The external force estimation means may form a linear complementarity problem which is established between the acceleration and the external force and solve the problem to estimate the acting state of the external force.

The motion state measurement means may determine a posture and a position at the predetermined portion.

The external force estimation means may estimate the external force acting upon a portion whose contact with the external force is detected by the distribution type contacting state detection means. Or, the external force estimation means may estimate the external force regarding the acting direction obtained from an outer shape of the portion at which contact with the external world is detected by the distributed type contacting state detection means. In this instance, the external force estimation means may estimate a normal reaction force or a friction force at the portion at which contact with the external world is detected by the distribution type contacting state detection means.

According to another embodiment of the present invention, there is provided an external force estimation system for estimating an external force acting upon a robot apparatus which includes a machine body which in turn includes a plurality of movable joints, including distribution type face contacting state detection means configured to detect a contacting state of an arbitrary region of the machine body with the external world, actuator current state measurement means configured to measure a position, a speed and a generation force at present of each of the joint actuators, motion state measurement means configured to measure an acceleration and an angular speed at least at one portion of the machine body, motion equation setting means configured to set a motion equation of the robot apparatus, known term calculation means configured to calculate a known term of the motion equation from the current states of the joint actuators obtained from the actuator current state measurement means and the current state of the robot apparatus obtained from the motion state measurement means, and external force estimation means configured to estimate the external force as an unknown term of the motion equation.

In the external force estimation system according to the first embodiment described above, the distribution type contacting state detection means detects a contacting state of an arbitrary portion of the machine body with the external world. However, in the external force estimation system according to the second embodiment, the distribution type face contacting state detection means detects a contacting state with the external world in a unit of a region. In such an instance, the external force estimation means estimates the external force acting upon a point on the outer shape in the region whose contact with the external world is detected by the distribution type face contacting state detection means. Further, an external force acting upon each of vertices which form the outer shape of the region whose contact with the external world is detected by the distribution type face contacting state detection means is determined, and it is estimated that an external force is applied to the position of the center of gravity of the region.

According to a further embodiment of the present invention, there is provided an external force estimation system for estimating an external force acting upon a robot apparatus which includes a machine body which in turn includes a plurality of movable joints and has an acting point at which an external force acts, including actuator current state measurement means configured to measure a position, a speed and a generation force at present of each of joint actuators, motion state measurement means configured to measure an acceleration and an angular speed at least at one portion of the machine body, motion equation setting means configured to set a motion equation of the robot apparatus at the acting point, known term calculation means configured to calculate a known term of the motion equation from the current states of the joint actuators obtained from the actuator current state measurement means and the current state of the robot apparatus obtained from the motion state measurement means, and external force estimation means configured to estimate the external force at the acting point as an unknown term of the motion equation.

In the external force estimation system according to the third embodiment described above, a point of action at which an external force acts is set in advance to a robot apparatus of an object of external force estimation. Therefore, a distribution type element for detecting a contacting state is not required. In such an instance, the known term calculation means determines an operation space inertia inverse matrix and a bias acceleration at the point of action of an external force by dynamics arithmetic operation to calculate a known term of a motion equation. Then, the external force estimation means estimates the external force applied to the predetermined point of action of an external force such that a relationship which satisfies the motion equation is established between the operation space inertia inverse matrix and the bias acceleration.

According to a fourth embodiment of the present invention, there is provided a computer program described in a computer-readable form so as to execute, on a computer system, a process for estimating an external force acting upon a robot apparatus which includes a machine body which in turn includes a plurality of movable joints, the computer program causing the computer system to execute the steps of detecting a contacting state of an arbitrary portion of the machine body with the external world, measuring a position, a speed and a generation force at present of each of the joint actuators, measuring an acceleration and an angular speed at least at one portion of the machine body, setting a motion equation of the robot apparatus, calculating a known term of the motion equation from the current states of the joint actuators obtained at the actuator current state measurement step and the current state of the robot apparatus obtained at the motion state measurement step, and estimating an acting state of the external force as an unknown term of the motion equation.

According to a fifth embodiment of the present invention, there is provided a computer program described in a computer-readable form so as to execute, on a computer system, a process for estimating an external force acting upon a robot apparatus which includes a machine body which in turn includes a plurality of movable joints, the computer program causing the computer system to execute the steps of detecting a contacting state of an arbitrary region of the machine body with the external world, measuring a position, a speed and a generation force at present of each of joint actuators, measuring an acceleration and an angular speed at least at one portion of the machine body, setting a motion equation of the robot apparatus, calculating a known term of the motion equation from the current states of the joint actuators obtained at the actuator current state measurement step and the current state of the robot apparatus obtained at the motion state measurement step, and estimating the external force as an unknown term of the motion equation.

According to a sixth embodiment of the present invention, there is provided a computer program described in a computer-readable form so as to execute, on a computer system, a process for estimating an external force acting upon a robot apparatus which includes a machine body which in turn includes a plurality of movable joints and has an acting point at which an external force acts, the computer program causing the computer system to execute the steps of measuring a position, a speed and a generation force at present of each of joint actuators, measuring an acceleration and an angular speed at least at one portion of the machine body, setting a motion equation of the robot apparatus at the acting point, calculating a known term of the motion equation from the current states of the joint actuators obtained at the actuator current state measurement step and the current state of the robot apparatus obtained at the motion state measurement step, and estimating the external force at the acting point as an unknown term of the motion equation.

The computer programs according to the fourth to sixth embodiments of the present invention define computer programs described in a computer-readable form so as to execute a predetermined process on a computer system. In other words, if the computer programs according to the fourth to sixth embodiments of the present invention are installed into a computer program, then cooperative actions are exhibited on the computer system. Consequently, action and advantages similar to those of the external force estimation systems according to the first to third embodiments of the present invention can be achieved.

According to the present invention, a superior robot apparatus can be provided which can specify a portion thereof which contacts with the external world when it performs physical interactions with a human being or an object, estimate a force acting upon the contacting portion and suitably control the dynamics of the entire robot.

Further, according to the present invention, an external force estimation method can be provided wherein, by combining a distribution type tactile sensor of the on/off type which is available at the time of filing of the present application for patent in Japan with dynamics arithmetic operation of the entire robot to estimate a force acting upon each tactile sensor, also when the robot performs various physical interactions with the external world, both of a contacting state and an acting force at an arbitrary place of the machine body of the robot can be measured.

Further, where the external force estimation method to which the present invention is applied is combined with an inertia sensor such as an acceleration sensor or a gyro, it can be applied also to such a situation that the entire robot moves while it is hard to hold the posture of the robot fixedly.

In the past, in a system which includes only a contact sensor which detects on/off information, an output value of the sensor is not worked at all but is utilized only as on/off information. In contrast, according to the present invention, a force acting upon a contact sensor member can be estimated by combining on/off information obtained from various portions of the robot with some other physical quantity such as the dynamics of the entire machine body of the robot, a joint force state or the motion state of the entire robot.

According to the present invention, if it is applied to mechanisms and apparatus in which contact sensors which can acquire only on/off information are disposed, then a force acting upon the portion of any of the sensors which detects an on state can be estimated in some other motion state. In other words, force information at many portions can be estimated by a simple and convenient system configuration, and as a result, a system which is less expensive with respect to an amount of information of force which can be estimated can be provided.

Many sensors have a fragile structure such as a rare skew field. In contrast, the external force estimation method to which the present invention is applied estimates a force based on sensor outputs such as contact sensors which detect only on/off information, a posture sensor and encoders and current sensors in actuators. Therefore, the external force estimation method generally involves no fragile structure and is robust. Accordingly, the necessity for an operation such as re-calibration is less likely to give rise.

The above and other scopes, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

A. Configuration of the Robot

Figure 1:
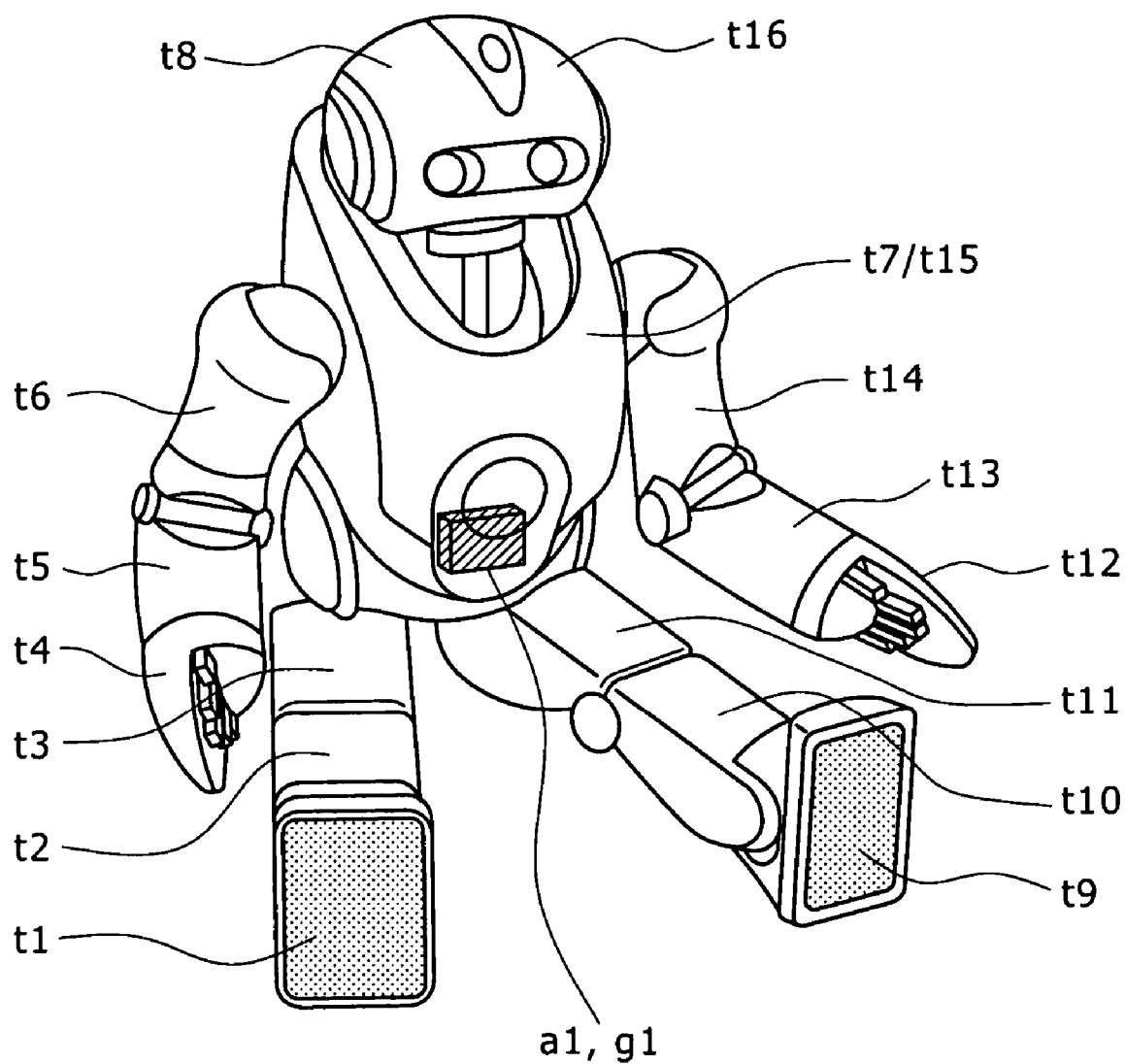
FIG. 1 is a view showing an appearance configuration of a robot apparatus to which the present invention is applied.

FIG. 1 shows an example of an appearance configuration of a robot apparatus to which the present invention is applied. Referring to FIG. 1, the robot apparatus shown is a human-like robot and includes a pelvis member, two leg members as moving members connected to the pelvis member and the upper part of the machine body connected to the pelvis member by a hip joint. Two arm members are connected to the upper part of the machine body, and a head member is connected to the upper part of the machine body through a neck joint.

The left and right leg members have totaling six degrees of freedom including three degrees of freedom of the hip joint, one degree of freedom of the knee joint and two degrees of freedom of the ankle joint. Further, the left and right arm members have totaling six degrees of freedom including three degrees of freedom of the shoulder joint, one degree of freedom of the elbow joint and two degrees of freedom of the wrist joint. The neck joint and the waist joint have three degrees of freedom around X, Y and Z axes.

An actuator for driving each of joint shafts is formed, for example, from a DC brushless motor and a speed reducer as well as a position sensor for detecting the rotational position of an output power shaft of the speed reducer. The joint driving actuators are connected to a host computer which controls operation of the entire robot apparatus such that they can receive position control target values from the host computer and transmit output torques, joint angles and joint angular speeds at present to the host computer.

Figure 2:
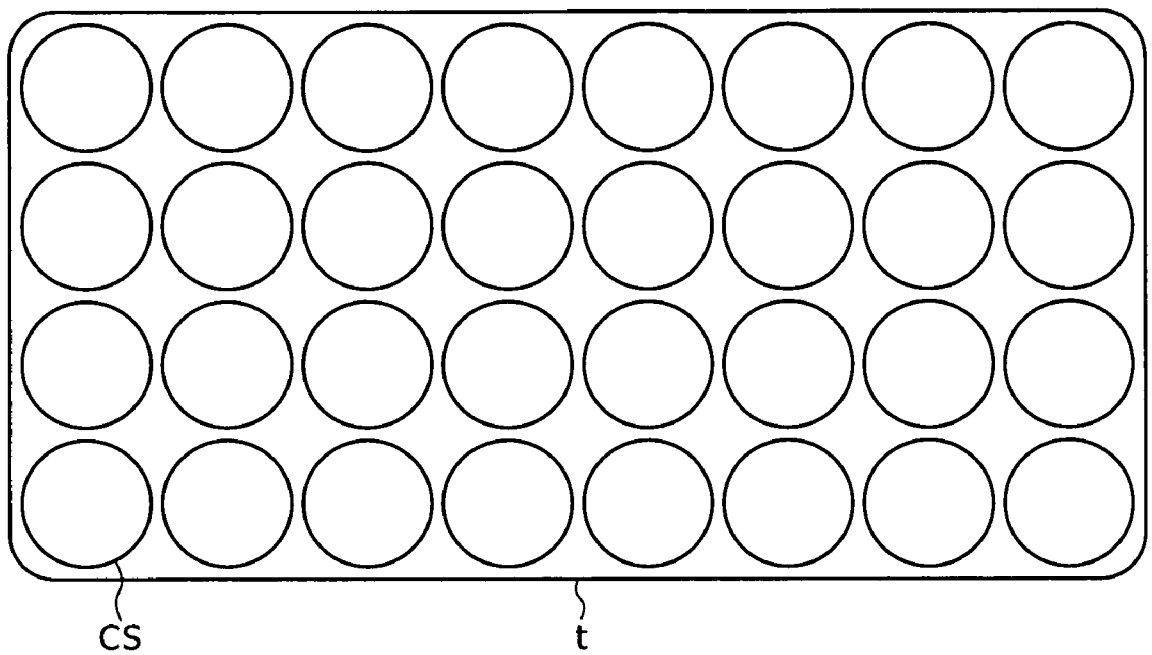
FIG. 2 is a schematic view showing a configuration of a tactile sensor group used in the robot apparatus shown in FIG. 1.

Tactile sensor groups t1, t2, . . . , t17 are attached to portions of the surface of the robot apparatus shown in FIG. 1 which are estimated to contact with the external world. FIG. 2 shows one of such tactile sensor groups t1 to t17. Referring to FIG. 2, one tactile sensor group t includes a plurality of tactile sensors CS disposed in an array and individually capable of detecting a contacting state independently of each other. Thus, a detailed contacting position can be specified depending upon which ones of the tactile sensors CS of the tactile sensor group t are in a contacting state.

Figure 3:
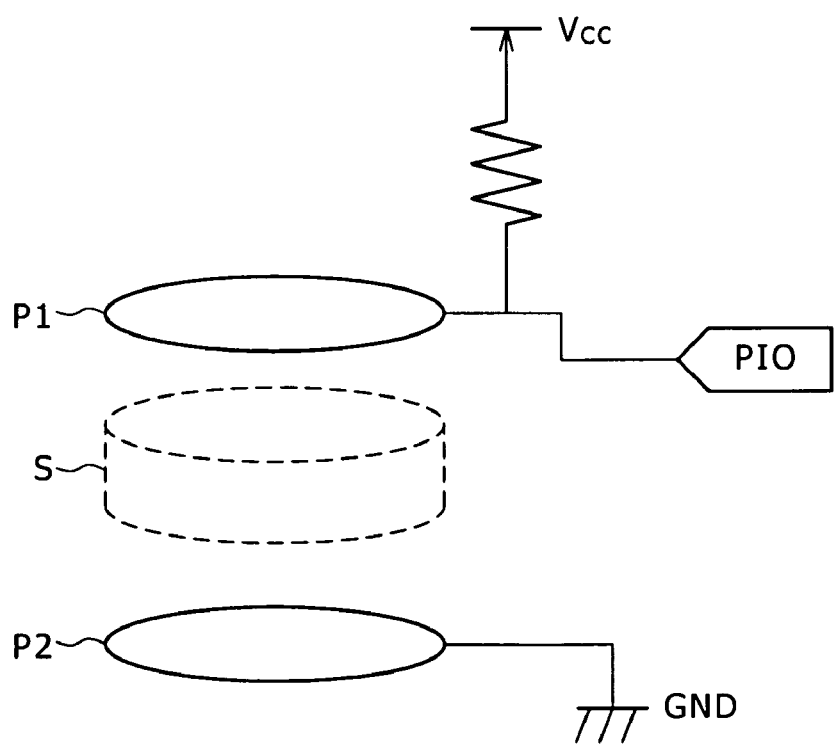
FIG. 3 is a view schematically showing a configuration of a tactile sensor of the tactile sensor group shown in FIG. 2.

FIG. 3 schematically shows the configuration of the tactile sensor CS. Referring to FIG. 3, the tactile sensor CS is structured such that two pole plates P1 and P2 are disposed in an opposing relationship to each other with an air gap S left therebetween, and a potential Vcc is applied to the pole plate P1 while the pole plate P2 is grounded. The pole plate P1 is inputted to a microcomputer through a parallel interface (PIO) so that the microcomputer can decide a contacting state between the pole plates P1 and P2, that is, whether or not an external force acts upon the tactile sensor CS.

One microcomputer is disposed in the proximity of each tactile sensor group t such that detection signals of all tactile sensors CS of the tactile sensor group t are inputted to the microcomputer so that the microcomputer collects on/off states of the tactile sensors CS. The microcomputer thus transmits whether or not the portion is in contact with the external world and the contacting position to a host computer.

Further, a three-axis acceleration sensor a1 and a three-axis angular speed sensor (gyro) g1 are incorporated in the pelvis member of the robot apparatus. In the proximity of the acceleration sensor a1 and the angular speed sensor g1, a microcomputer for measuring sensor values of them is disposed, and a result of the measurement is transmitted from the microcomputer to the host computer.

Figure 4:
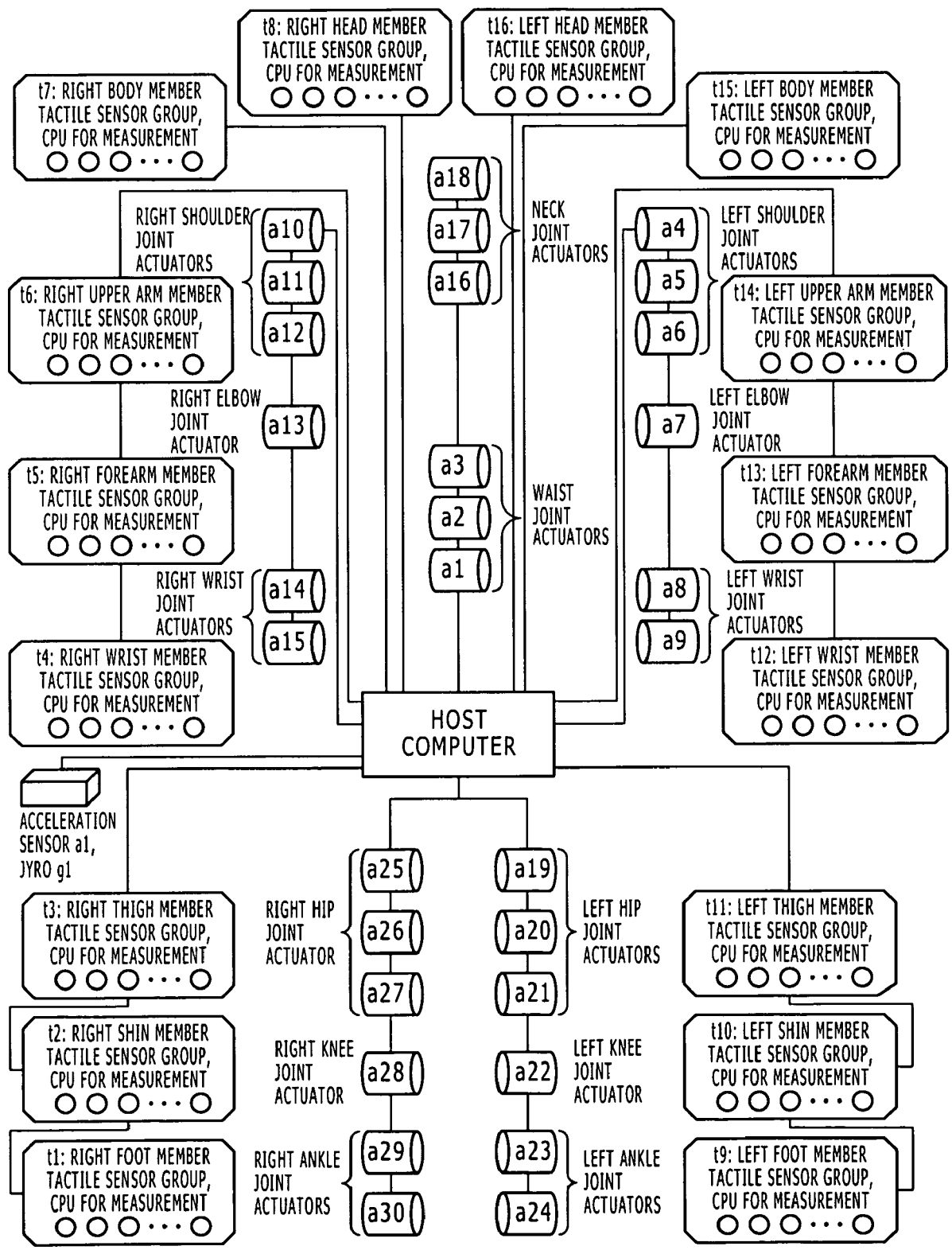
FIG. 4 is a schematic view showing an example of a configuration of a connection topology of the robot apparatus shown in FIG. 1.

FIG. 4 shows an example of a configuration of a connection topology of the robot apparatus shown in FIG. 1.

Referring to FIG. 4, the robot apparatus shown has three-axis waist joint actuators a1, a2 and a3 and three-axis neck joint actuators a16, a17 and a18 at the body part thereof. The waist joint actuators a1, a2 and a3 and the neck joint actuators a16, a17 and a18 are connected serially to the host computer. Each of the waist joint actuators a1, a2 and a3 and the neck joint actuators a16, a17 and a18 receives a position control target value therefor through a serial cable and transmits an output torque, a joint angle and a joint angular speed at present to the host computer.

Further, the robot apparatus has three-axis shoulder joint actuators a4, a5 and a6, a one-axis elbow joint actuator a7 and two-axis wrist joint actuators a8 and a9 at the left arm member. The actuators mentioned are connected serially to the host computer. Similarly, the robot apparatus has three-axis shoulder joint actuators a10, a11 and a12, a one-axis elbow joint actuator a13 and two-axis wrist joint actuators a14 and a15 at the right arm member. The actuators mentioned are connected serially to the host computer.

Further, the robot apparatus has three-axis hip joint actuators a19, a20 and a21, a one-axis knee joint actuator a22 and two-axis ankle joint actuators a23 and a24 at the left leg member. The actuators mentioned are connected serially to the host computer. Similarly, the robot apparatus has three-axis hip joint actuators a25, a26 and a27, a one-axis knee joint actuator a28 and two-axis ankle joint actuators a29 and a30 at the right leg member. The actuators mentioned are connected serially to the host computer.

Each of the actuators used for the joints is formed, for example, from a DC brushless motor and a speed reducer as well as a position sensor for detecting the rotational position of the output power shaft of the speed reducer. The joint driving actuators are driven to rotate in accordance with position control target values supplied thereto from the outside and output current output torques, joint angles and joint angular speeds. A joint actuator of the type mentioned is disclosed, for example, in Japanese Patent Laid-Open No. 2004-181613 assigned to the assignee of the present invention.

A right foot member tactile sensor group t1, a right shin member tactile sensor group t2 and a right thigh member tactile sensor group t3 are disposed on the right leg member of the robot apparatus and connected serially to the host computer. Each of the tactile sensor groups t1 to t3 includes a microcomputer as described hereinabove, which collects and transmits on/off states of the tactile sensors CS of the respective tactile sensor group t to the host computer through the corresponding serial cable. Similarly, a left foot member tactile sensor group t9, a left shin member tactile sensor group t10 and a left thigh member tactile sensor group t11 are disposed on the left leg member. Each of the internal microcomputers collects and transmits on/off states of the tactile sensors CS of the respective tactile sensor group t to the host computer through the corresponding serial cable.

A right wrist member tactile sensor group t4, a right forearm member tactile sensor group t5 and a right upper arm member tactile sensor group t6 are disposed on the right arm member of the robot apparatus. Each of the internal microcomputers collects and transmits on/off states of the tactile sensors CS of the respective tactile sensor group t to the host computer through the corresponding serial cable. Similarly, a left wrist member tactile sensor group t12, a left forearm member tactile sensor group t13 and a left upper arm member tactile sensor group t14 are disposed on the left arm member. Each of the internal microcomputers collects and transmits on/off states of the tactile sensors CS of the respective tactile sensor group t to the host computer through the serial cable.

A pair of right and left body member tactile sensor groups t7 and t15 are attached to right and left portions of the body part of the robot apparatus. Each of the internal microcomputers collects and transmits on/off states of the tactile sensors CS of the respective tactile sensor group t to the host computer through the corresponding serial cable.

A pair of right and left head member tactile sensor groups t8 and t16 are attached to right and left portions of the head member of the robot apparatus. Each of the internal microcomputers collects and transmits on/off states of the tactile sensors CS of the respective tactile sensor group t to the host computer through the corresponding serial cable.

B. Estimation Method of an External Force

The robot apparatus to which the present invention is applied can estimate an external force using a combination of distributed tactile sensors of the on/off type and dynamics arithmetic operation of the entire robot. In particular, on/off information obtained from various portions of the robot apparatus is combined with other physical quantities such as dynamics of the entire body of the robot, joint force states and motion states of the entire robot to estimate forces acting upon the contact sensor locations. Accordingly, the robot apparatus can measure both of a contacting state and an acting force at an arbitrary location of the machine body thereof also when the robot apparatus physically interacts in various manners with the external world.

In the following, a method of estimating the magnitude and the direction of an external force at all points of action of a force in a system wherein a point of action of a force from the external world can be detected but the magnitude and direction of the force cannot be detected is studied.

Figure 5:
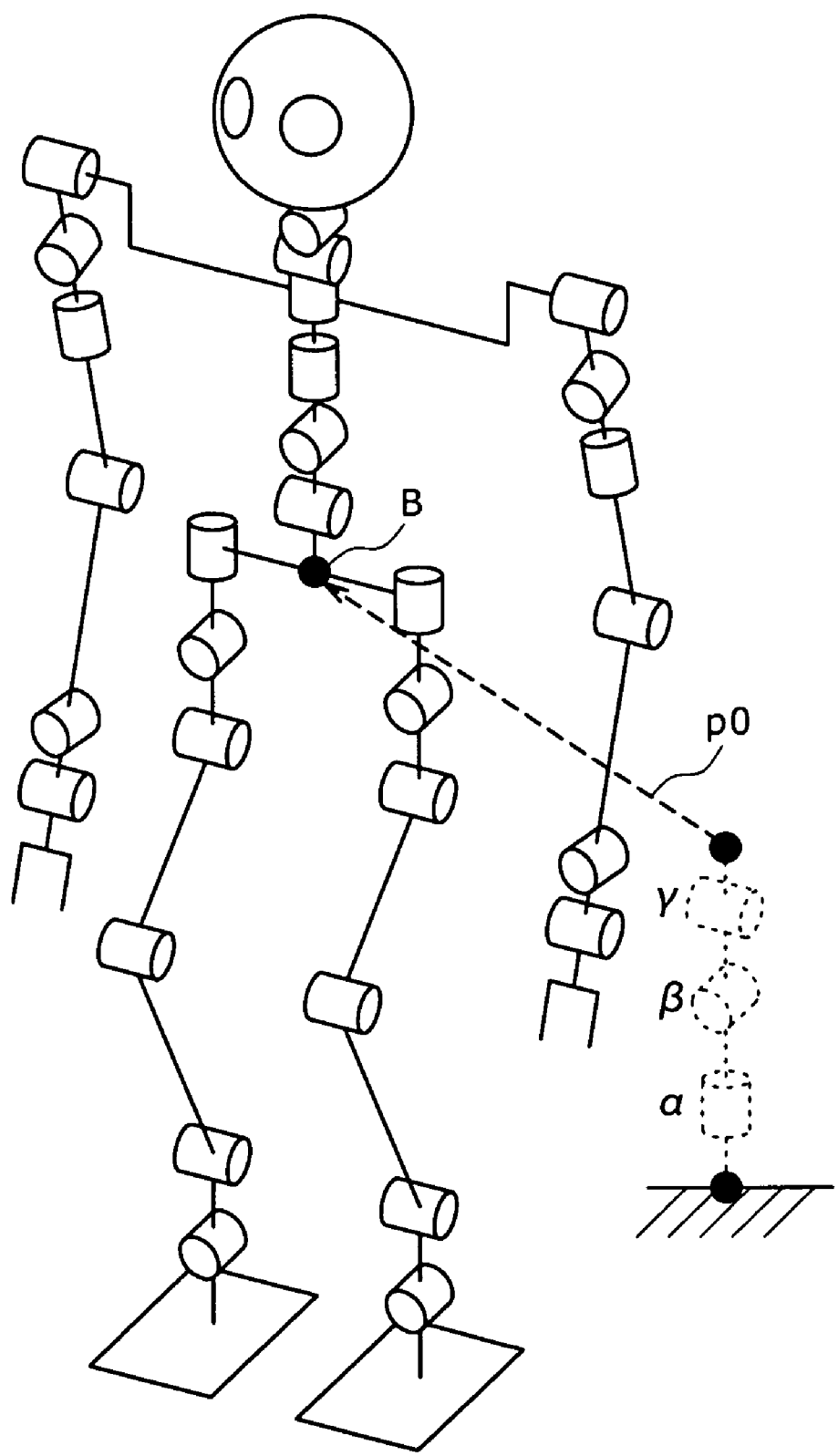
FIG. 5 is a schematic view showing a joint degree-of-freedom model of the robot apparatus shown in FIG. 1.

FIG. 5 illustrates a joint degree-of-freedom model of the robot apparatus shown in FIG. 1. As can be seen from FIG. 5, a mobile robot of the bipedal walking type can be represented as an open link tree structure based on the pelvis B.

A mobile robot can freely move in the world space and change its posture. Accordingly, as a state variable which represents the state of the entire robot, the Euler angle $\alpha=(\alpha, \beta, \gamma)^T$ and the position $p_0$ (position $p_{0x}$, $p_{0y}$, $p_{0z}$) of the pelvis B are introduced. Consequently, the robot can be treated as a link structure, and therefore, the equation of motion of the robot can be represented in such a form as given by the following expression (1):

$$\tau = H\ddot{q} + b - J^T f \qquad (1)$$

where q is a generalization variable of the entire robot and is formed from a vector wherein postures $\alpha$ and positions $P_0$ of the base as states of motion of the robot are enumerated and a vector $\theta$ obtained by enumerating all joint values as current states of the actuators. In particular, q is represented by such a form as given by the following expression (2):

$$q = (\alpha, p_0, \theta)^T \qquad (2)$$

Further, $\tau$ in the expression (1) above is a generalization force corresponding to the generalization variable q, and the components corresponding to $\alpha$ and $P_0$ are 0 (because an actuator which generates force does not exist) and the component corresponding to $\theta$ is equal to the generation force of the actuator which drives each joint section. Further, H represents the inertia matrix of the entire robot, and b the gravity, Coriolis force or the like. f represents the external force. J represents the Jacobean which coordinates the speed generated in the acting direction of the external force/dot x (based on the Latex format) and the generalized speed/dot q (based on the Latex format), and is represented by the following expression (3):

$$\dot{x} = J\dot{q} \qquad (3)$$

By transforming the expression (1) above, the following expression (4) is obtained:

$$\ddot{x} = JH^{-1}(\tau - b) + \dot{J}\dot{q} + \Lambda^{-1} f \qquad (4)$$

where $\Lambda^{-1}$ is an operation space inertia inverse matrix regarding the external force acting direction and is represented by the following expression (5):

$$\Lambda^{-1} = JH^{-1}J^T \qquad (5)$$

In the expression (4) given above, the first and second terms on the right side and the operation space inertia inverse matrix $\Lambda^{-1}$ can be estimated from the state of motion at present by a method hereinafter described. However, free combinations of the acceleration generated in the external force acting direction and the external force f are not permitted. A normal reaction force acts only in the direction in which the robot and the environment are spaced away from each other but does not act in the opposite direction. A frictional force cannot act exceeding a force of a friction cone determined by the normal reaction force. In particular, such a linear complementarity problem as given by the following expressions (6) to (8) is formed:

$$\ddot{x} = \Lambda^{-1} f + c \qquad (6)$$

$$f_{N_i} \geq 0, \ddot{x}_{N_i} \geq 0 \text{ and } f_{N_i}\ddot{x}_{N_i} = 0 \qquad (7)$$

$$|f_{F_i}| \leq \mu_i f_{N_i}, f_{F_i}\ddot{x}_{F_i} < 0 \text{ and } \ddot{x}_{F_i}(\mu_i f_{N_i} - |f_{F_i}|) = 0 \qquad (8)$$

c in the expression (6) above represents the bias acceleration, that is, the acceleration which is generated at the point of action when no external force acts, and is represented by the following expression:

$$c = JH^{-1}(\tau - b) + \dot{J}\dot{q}$$

Meanwhile, $f_{N_i}$ and $f_{F_i}$ appearing in the expressions (7) and (8) represent the external force and the frictional force in the normal direction to the point i of action, respectively. Meanwhile, $\mu_i$ represents the coefficient of friction at the point of action.

It should be recognized that, with the robot apparatus according to the embodiment of the present invention, all external forces f can be estimated by solving such a linear complementarity problem. Further, a mathematic solution itself of a linear complementarity problem is disclosed, for example in "Fast Contact Force Computation for Nonpenetrating Rigid Bodies," SIGGRAPH 94, pp.23 to 24, 1994. Therefore, such a solution as just mentioned is omitted here. In the following, a method of estimating an operation space inertia inverse matrix $\Lambda^{-1}$ and a bias acceleration c from a state of motion of the robot is described.

Calculation Method of the Operation Space Inertia Inverse Matrix $\Lambda^{-1}$:

If it is intended to obtain the left side from the right side of the expression (6) given hereinabove, then this can be treated as a problem of determining an acceleration in an external force acting direction at a point of application of an external force when such an external force or a force relating to an actuator generated force, a force of gravity, a force relating to a velocity product (such as a Coriolis force). A problem of determining an acceleration from a force is generally known as forward dynamics arithmetic operation and can be represented as given by the following expression:

$$\ddot{x} = FWD(q, \dot{q}, \tau, g, f)$$

For the most basic forward dynamics arithmetic operation, refer to, for example, "Efficient Dynamic Computer Simulation of Robotic Mechanisms," Journal of Dynamic Systems, Measurement and Control, pp.205 to 211, 1982.

Here, if the expressions given below are substituted into the expression above, then an acceleration which is generated in a situation wherein a force of gravity, a joint force or a force relating to a velocity product (such as a Coriolis force) is not generated can be determined. In other words, c=0 can be satisfied.

$$\dot{q} = 0, \tau = 0, g = 0$$

It can be seen that, if the calculation is executed under a condition of $f=e_j$, that is, under a condition that only the ith unit external force acts, then the ith column of the operation space inertia inverse matrix $\Lambda^{-1}$ can be determined. Therefore, the operation space inertia inverse matrix $\Lambda^{-1}$ can be obtained by executing arithmetic operation of the expression given below for all values of i:

$$i\text{th column of } \Lambda^{-1}=FWD(q,0,0,0,e) \qquad (9)$$

Calculation Method of the Bias Acceleration c:

On the contrary, the bias acceleration c can be extracted by executing the forward dynamics arithmetic operation under the condition of the external force f=0. In other words, $$c=FWD(q,\dot{q},\tau,g,0) \qquad (10)$$

As can be recognized from the expressions (9) and (10), a generalization variable q and a generalization rate/dot q (based on the Latex format), a generalization force τ and the acceleration g of gravity are required as information for the calculation of the operation space inertia inverse matrix $\Lambda^{-1}$ and the bias acceleration c. In the following, a calculation method for them is described.

Calculation Method of the Generalization Variable q:

A factor corresponding to an actual joint of the robot from among factors of the generalization variable q is the joint angle itself of the robot, and a result of measurement by the encoder can be used as it is.

Components corresponding to the posture and the position of the entire robot, that is, the Euler angle α and the position $p_0$ of the pelvis B can be estimated basically by means of inertia sensors (a1 and g1 shown in FIG. 1). However, there is no necessity to determine all components of the entire robot. Different from an application to a dynamic simulation wherein a result of arithmetic operation of forward dynamics is integrated to form a history of the position, in the present embodiment, only it is necessary to discriminate the posture of the pelvis B with respect to the direction of the force of gravity. However, details in this regard relate to detailed contents of arithmetic operation of the forward dynamics and are cumbersome, and therefore, no further description is given of the same herein.

Such a method of determining the posture of the machine body with respect to a gravity vector from outputs of the acceleration sensor and the gyro carried on the machine body is a well known technique called strap down method. The Euler angle α of the pelvis can be determined from a result of the method just mentioned. A posture detection method according to the strap down method is disclosed, for example, in Japanese Patent Laid-Open No. Hei 6-201863. Meanwhile, since the position $p_0$ of the pelvis is not particularly important, here the position $p_0$ is assumed to be $p_0=0$.

Calculation Method of the Generalization Speed

A factor corresponding to an actual joint of the robot from among factors of the generalization rate/dot q (based on the Latex format) is equal to the joint angular speed of the robot. Therefore, a result of numerical value integration of an encoder or a result of measurement by a tachometer can be used as it is.

Components corresponding to the posture and the position of the entire robot, that is, the angular speed/dot α (based on the Latex format) of the Euler angle α of the pelvis B and the speed/dot $p_0$ (based on the Latex format) of the position $p_0$, can be estimated basically depending upon the inertia sensor. The forward dynamics arithmetic operation can be converted into a local representation of each link coordinate system, and in this instance, such physical quantities can be replaced by an angular speed and a translational speed obtained from the sensors (refer to FIG. 5) disposed at the pelvis B as viewed from the coordinate system fixed at the pelvis B. However, details in this regard relate to detailed contents of arithmetic operation of the forward dynamics and are cumbersome, and therefore, no further description is given of the same herein.

In particular, an output of the gyro can be used as the angular speed value of the Euler angle α of the pelvis B/dot α (based on the Latex format). Meanwhile, an integrated value of an output of the acceleration sensor from which the gravitational acceleration is removed can be used as the speed value of the position $p_0$ of the pelvis B/dot $p_0$ (based on the Latex format). In order to remove the gravitational acceleration from the output of the acceleration sensor, arithmetic operation of the following expression should be performed:

$$a=-(a_m+R_B^T g) \qquad (11)$$

where $a_m$ is the output of the acceleration sensor, $R_B$ is a posture matrix of the pelvis B obtained by the strap down method, and a is the translational acceleration as viewed from a coordinate system fixed at the pelvis B. In principle, if a is numerically integrated, then the speed of the pelvis B at the position $p_0$/dot $p_0$ (based on the Latex format) can be obtained. However, since actually a problem of a drift is involved, it is necessary to use a result obtained when the integrated value is passed through an appropriate high-pass filter.

Calculation Method of the Generalization Force τ:

A factor corresponding to an actual joint of the robot from among factors of the generalization force τ is a torque itself-generated by the actuator of the robot. Therefore, a result of measurement by means of a torque sensor or a current sensor in the actuator can be used.

The components corresponding to the posture and the position of the entire robot are zero because no actuators therefor exist. It is to be noted that the inertia and the friction in the actuators are included in forward dynamics arithmetic operation and taken into consideration. However, it is difficult to identify the value of the components with a high degree of accuracy and the number of factors which are not formulated is not small. Since the values of the factors increase together with the reduction ratio of the actuator, preferably the reduction ratio of the actuators is set as low as possible. Generally, in order to carry out the present invention, preferably an actuator having a high back drivability is used.

Calculation of the Gravitational Acceleration g:

There is no necessity for special calculation for the gravitational acceleration. In the forward dynamics arithmetic operation, the gravity is taken into consideration by modeling that the base of the arithmetic operation is accelerated by the gravitational acceleration g. If this value can be changed from the outside, then the gravitational acceleration can be treated as a variable in the forward dynamics arithmetic operation.

Definition of the Acting Direction of an External Force:

The calculation methods for the generalization variable q and the generalization speed/dot q (based on the Latex format) of the same, the generalization force τ and the gravitational acceleration g are clarified by the foregoing description. In order to solve the expression (6) given hereinabove, it is further necessary to decide the point of action and the direction of an external force. In the following, a setting method for the acting direction of an external force is described.

Figure 6:
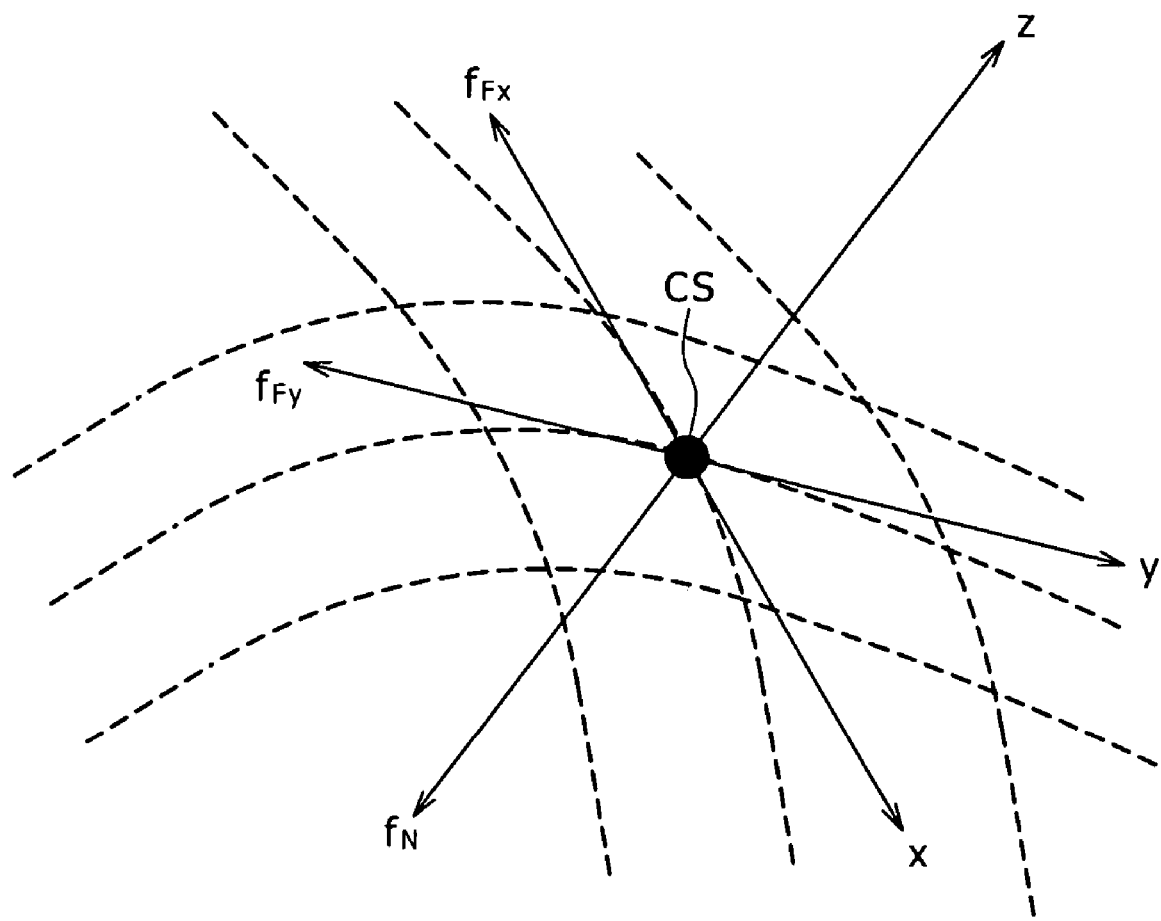
FIG. 6 is a diagrammatic view showing a coordinate system set at a place at which the tactile sensor shown in FIG. 3 is installed.

FIG. 6 illustrates a coordinate system $C_{CS}$ set at a place at which a tactile sensor CS is installed. The coordinate system has a z axis in a normal line direction of the shape of the robot at this point, and has an x axis and a y axis in directions perpendicular to the z axis. If it is assumed that the shape of the robot does not change on the individual link level, then the directions of the x, y and z axes at the installation point of each contact sensor are fixed and can be calculated and stored as a fixed table in advance.

The point of action of an external force is the installation position of a tactile sensor CS whose output exhibits an on state, that is, the position on the coordinate system $C_{CS}$. The acting directions at the tactile sensor CS are set to be opposite to the directions of these coordinate axes. In particular, the direction of the normal reaction force $f_N$ is set to the −z axis direction, and the directions of the frictional forces $f_{Fx}$ and $f_{Fy}$ are set to the −x axis direction and the −y axis direction, respectively. If it is assumed that the forward dynamics arithmetic operation is formed from a local coordinate system representation, then also the point of action and the acting direction of the external force may be prepared as local coordinate system representations as viewed from a coordinate system fixed at a link at which the external force acts. If it is assumed that the link does not change its shape, then both of the point of action and the acting direction of the external force are fixed values. Also the coefficient of friction at this point can be determined in advance based on the material of the link and becomes a constant.

The acting directions of the normal reaction force and the frictional force actually rely also upon the shape of the external force. Accordingly, when it is tried to further raise the accuracy in external force estimation, such a countermeasure as to form an outer shape of each link from a curved line which can be differentiated may be taken. Although also the coefficient of friction strictly relies also upon the material of an object of contact, here it is determined approximately only from the material of the link. If also the material of a counterpart is known, then such a process as to use an average between those of the two materials may be taken.

As a result of the foregoing, as a vector wherein normal reaction forces $f_N$ and frictional forces $f_{Fx}$ and $f_{Fy}$ of all contact sensors are connected and juxtaposed, an entire external force vector represented by the following expression (12) is defined:

$$f = [f_{N1}, f_{Fx1}, f_{Fy1}, \ldots, f_{NM}, f_{FxM}, f_{FyM}]^T \quad (12)$$

where M is the total number of contact sensors. By the method described above, all of the values of the external forces can be determined by solving the linear complementarity problem expression given hereinabove as the expression (6).

Figure 7:
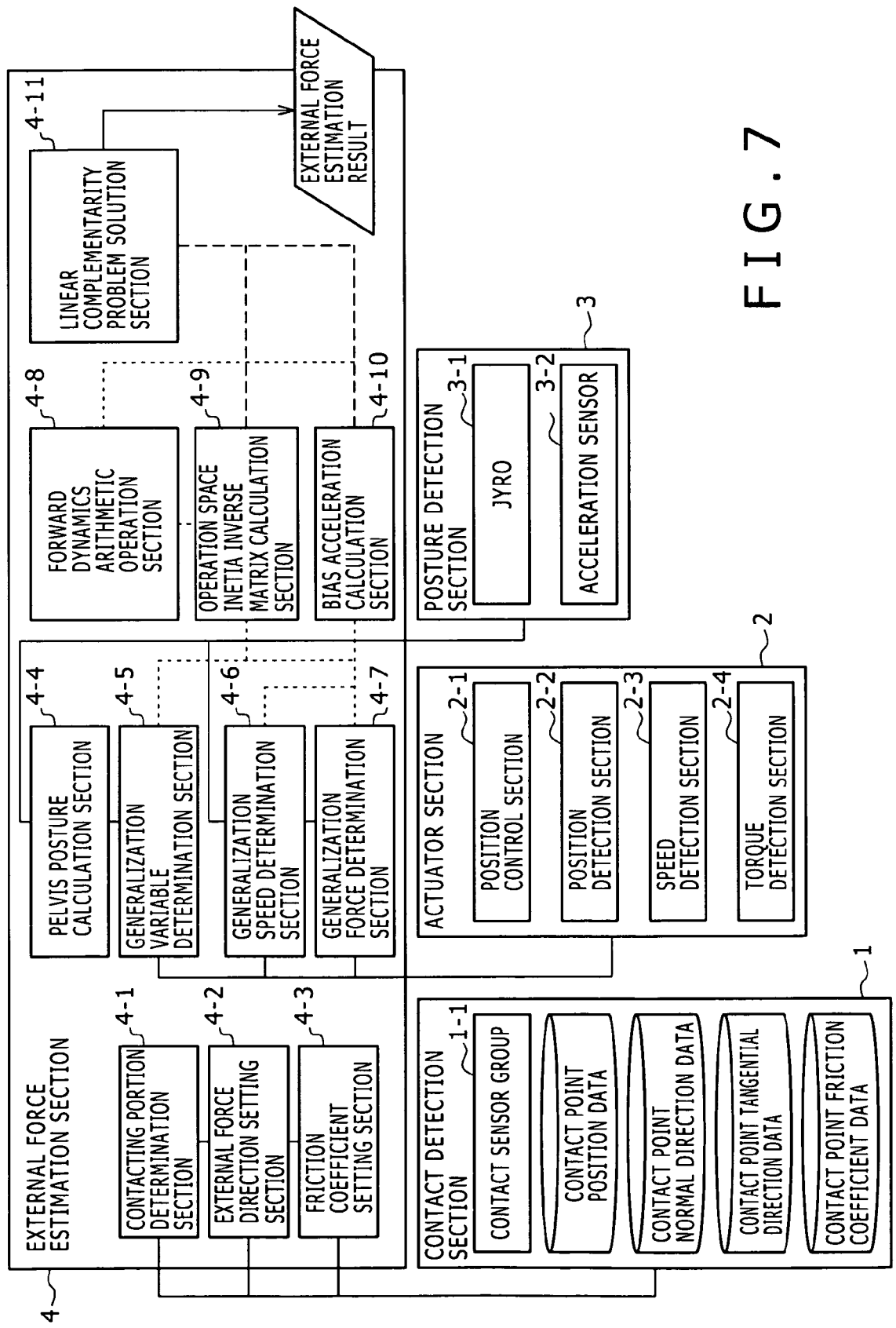
FIG. 7 is a block diagram showing a functional configuration for implementing an external force estimation method to which the present invention is applied.

FIG. 7 shows, in the form of a block diagram, a functional configuration of the robot apparatus for implementing the external force estimation method described hereinabove. Referring to FIG. 7, the robot apparatus which incorporates the external estimation method to which the present invention is applied is roughly divided into four functional blocks including a contact detection section 1, an actuator section 2, a posture detection section 3 and an external force estimation section 4.

The contact detection section 1 includes the tactile sensor groups described hereinabove (refer to FIG. 2) and position data of the positions at which the tactile sensors are attached, and has data regarding the normal line vector, tangential line vector and coefficient of friction of the outer shape at contacting points. The position data, normal line vectors and tangential line vectors are retained each in a representation as viewed from the local coordinate system to which the tactile sensor is attached. The contact detection section 1 measures on/off states of all contact sensors which form a contact sensor group 1-1 and delivers a list of position data, normal line vectors, tangential line vectors and coefficients of friction at contacting portions in accordance with a request.

The actuator section 2 performs control of all of the actuators of the position controlled type and state detection of the actuators. In particular, the actuator section 2 includes a position control section 2-1 for adjusting the torque output of the actuators so as to implement an angle target value, a position detection section 2-2 for measuring the current angle of the actuators, a speed detection section 2-3 for measuring the current angular speed of the actuators, and a torque detection section 2-4 for measuring the output torque of the actuators. The actuator section 2 receives a target angle of an actuator or returns an angle, an angular speed and a torque state at present in accordance with a request.

The posture detection section 3 performs measurement of a gyro 3-1 and an acceleration sensor 3-2 (refer to FIG. 4) attached to the pelvis member and returns measured values in accordance with a request.

The external force estimation section 4 estimates an external force generated at each contact sensor member based on returned results from the contact detection section 1, actuator section 2 and posture detection section 3. In the following, an internal configuration of the external force estimation section 4 is described.

A contacting portion determination section 4-1 issues an inquiry to the contact detection section 1 and produces a list of those tactile sensors CS which are in a currently contacting state, that is, in an on state and a position list of such tactile sensors CS.

An external force direction setting section 4-2 issues an inquiry to the contact detection section 1 for normal line information and tangential line information of those contact sensors whose on state is detected by the contacting portion determination section 4-1 and determines the direction of a normal reaction force and a frictional force (two x and y directions). The directions determined are opposite to the directions of the normal line vector and the tangential line vector.

A friction coefficient setting section 4-3 sets a coefficient of friction at a point of action of each external force. The coefficient of friction can be determined in advance based on the material of the pertaining link and is a constant. Although strictly the coefficient of friction relies also upon the material of an object of contact, the friction coefficient setting section 4-3 here is formed so as to approximately determine the coefficient of friction based only on the material of the link. If also the material of the counterpart is known, such processing as to average the coefficients of friction of the two members may be applied.

A pelvis posture calculation section 4-4 executes posture arithmetic operation according to the strap down method based on information of the angular speed and the acceleration of the pelvis detected by the posture detection section 3 to calculate posture information of the pelvis member.

A generalization variable determination section 4-5 produces a generalization variable q based on the posture information of the pelvis member produced by the pelvis posture calculation section 4-4 and the angle information of all actuators obtained from the actuator section 2.

A generalization speed determination section 4-6 produces a velocity vector of the generalization variable q based on integrated values (which are preferably passed through a high-pass filter as described hereinabove) of the angular speed (measurement value of the gyro) and the acceleration of the pelvis measured by the posture detection section 3 and angular speeds of all actuators obtained from the actuator section 2.

A generalization force determination section 4-7 produces a generalization force vector $\tau$ based on output torques of all actuators obtained from the actuator section 2.

A forward dynamics arithmetic operation section 4-8 is an arithmetic operation unit which executes forward dynamics arithmetic operation represented by the following expression:

$$\ddot{x} = FWD(q, \dot{q}, \tau, g, f)$$

The forward dynamics arithmetic operation section 4-8 is configured so that the value of an argument can be provided variably. The forward dynamics arithmetic operation is different from general forward dynamics arithmetic operation in that it returns a vector x of an acceleration which is generated in the acting direction of the external force. However, the forward dynamics arithmetic operation section 4-8 should be internally configured so as to receive a generalization acceleration once and calculate an acceleration in each external force direction.

An operation space inertia inverse matrix calculation section 4-9 uses the forward dynamics arithmetic operation section 4-8 to execute the arithmetic operation of the expression (9) given hereinabove for all external forces to calculate an operation space inertia inverse matrix $\Lambda^{-1}$. In particular, the operation space inertia inverse matrix calculation section 4-9 repeats a process of calculating an operation space acceleration (acceleration generated at an external force point of action)/ddot x (based on the Latex format) when a unit external force (external force whose norm is 1) acts as a test force for all external forces to obtain the operation space inertia inverse matrix $\Lambda^{-1}$. As the acting position and the acting direction of each external force, results of the contacting portion determination section 4-1 and the external force direction setting section 4-2 are used.

A bias acceleration calculation section 4-10 uses the forward dynamics arithmetic operation section 4-8 to execute arithmetic operation represented by the expression (10) given hereinabove to calculate a bias acceleration c. For the calculation, the bias acceleration calculation section 4-10 uses the generalization variable q produced by the generalization variable determination section 4-5, the normalization speed/dot q (based on the Latex format) produced by the generalization speed determination section 4-6 and the generalization force $\tau$ produced by the generalization force determination section 4-7. As the acting position and the acting direction of each external force, results of the contacting portion determination section 4-1 and the external force direction setting section 4-2 are used similarly as in the operation space inertia inverse matrix calculation section 4-9.

A linear complementarity problem solution section 4-11 sets the operation space inertia inverse matrix $\Lambda^{-1}$ calculated by the operation space inertia inverse matrix calculation section 4-9 and the bias acceleration c calculated by the bias acceleration calculation section 4-10 to the linear complementarity problem expression (6) and the expressions (7) and (8) and solves the expressions. As the coefficient of friction in the expression (8), a result obtained by the friction coefficient setting section 4-3 is used. As a result of the solution of the linear complementarity problem, all external forces f are determined.

Figure 8:
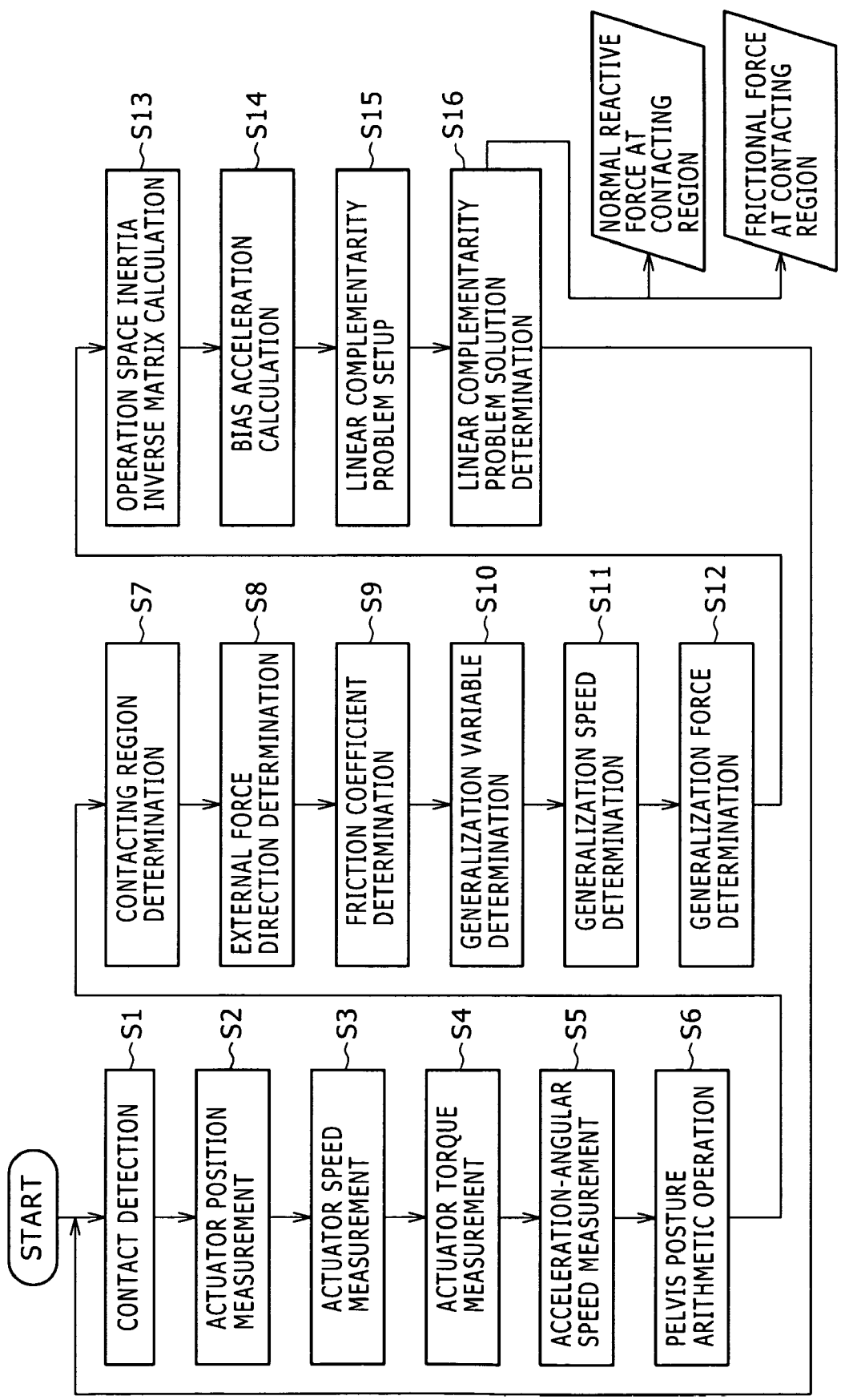
FIG. 8 is a flow chart illustrating a processing procedure for performing external force estimation of the robot apparatus shown in FIG. 1.

FIG. 8 illustrates, in the form of a flow chart, a processing procedure for performing external force estimation according to the embodiment of the present invention.

Referring to FIG. 8, state measurement of all contact sensors is performed (step S1). Then, the joint angle of all actuators is measured (step S2). Then, the joint angular speed of all actuators is measured (step S3). Thereafter, the joint torque of all actuators is measured (step S4).

Then, the acceleration sensor and the gyro installed at the pelvis B are measured (step S5). Then, posture arithmetic operation according to the strap down method is performed for a result obtained at step S5 to calculate posture information of the pelvis member (step S6).

Then, the positions of portions at which contact with the external world occurs (local representation as viewed from a coordinate system fixed at each link) are listed up based on a result at step S1 (step S7). Then, the directions of a normal reaction force and a frictional force acting at each point at which contact with the external world occurs are determined (step S8).

Then, a coefficient of friction at each point at which contact with the external world occurs is extracted from the database (step S9).

Then, the value of the generalization variable q is determined using results at steps S2 and S6 (step S10). Further, the value of the generalization speed/dot q (based on the Latex format) is determined using results at steps S3 and S5 (step S11). Then, the value of the generalization force $\tau$ is determined using a result at step S4 (step S12).

Then, the expression (9) is executed for all external forces using the forward dynamics arithmetic operation to calculate the operation space inertia inverse matrix $\Lambda^{-1}$ (step S13). Further, the expression (10) is executed using the forward dynamics arithmetic operation to calculate the bias acceleration c (step S14).

Then, the operation space inertia inverse matrix $\Lambda^{-1}$ obtained at step S13, the bias acceleration c obtained at step S14 and the coefficient of friction obtained at step S9 are set to the linear complementarity problem (expressions (6) to (8)) (step S15).

Then, the linear complementarity problem set at step S15 is solved to determine all external forces (normal reaction forces and frictional forces).

The series of processes described above is executed in a fixed cycle (for example, a control cycle) (step S16). A process which needs much time for calculation such as calculation of the operation space inertia inverse matrix $\Lambda^{-1}$ may be selectively executed at a low updating rate. This is particularly effective because an operation space inertia inverse matrix has a characteristic that it does not suddenly vary in time.

C. Modification 1

In the foregoing description, it is assumed that the contact detection section 1 is formed such that a plurality of tactile sensor groups each formed from a plurality of contact sensors disposed in an array are disposed on the whole machine body of the robot and a portion in which the robot body contacts with the external world is specified. As a modification, a contact detection section which detects not a portion which contacts with the external world but a region in which the robot body contacts with the external world may be used to similarly implement eternal force estimation.

Here, a case wherein face tactile sensors RCS which can detect that some place of a convex region contacts with the external world are disposed in a distributed manner on the surface of a robot is considered.

Figure 9:
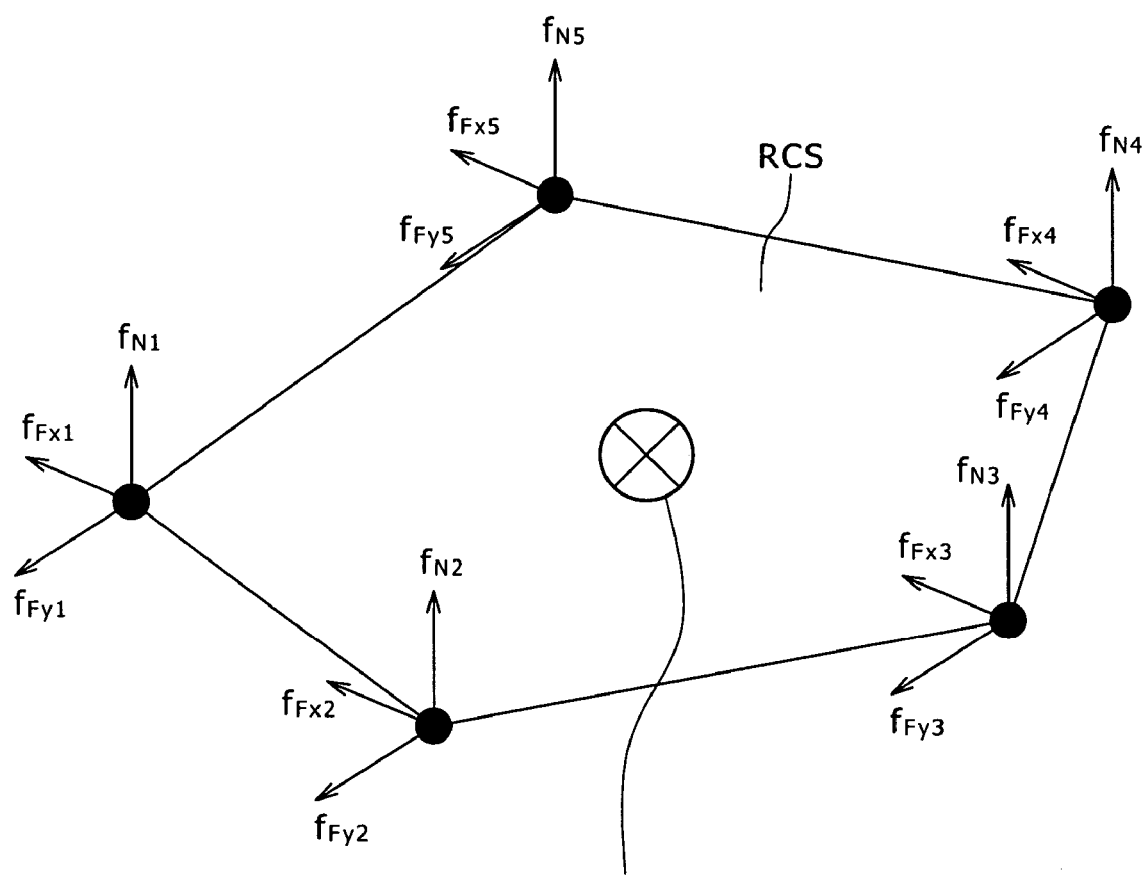
FIG. 9 is a diagrammatic view showing an example of a configuration of a face tactile sensor which can detect that some place of a convex portion is in contact with the external world.

In such an instance as just described, a point of action of an external force is set on the outer shape of each face tactile sensor RCS, and the external force can be estimated by a similar method assuming that a point contact sensor exists at the point. In an example shown in FIG. 9, a manner is illustrated wherein an external force is treated divisionally by point contact sensors at five points.

If a linear complementarity problem is solved, then the values of external forces applied at all points are determined. In order to obtain one point $x_a$ of action in the face tactile sensor region from this, where it is possible to regard the face tactile sensor lies in a plane, the position of the center of gravity of a normal reaction force should be determined as given by the following expression:

$$x_a = \frac{\sum f_{N_i} x_i}{\sum f_{N_i}} \quad (13)$$

where $f_{N_i}$ represents the normal reaction force at the ith vertex, and $x_i$ the position of the ith vertex. The acting force upon the point of action $x_a$ is a resultant force of the normal reaction forces and the frictional forces at all vertices $x_i$.

D. Modification 2

In the foregoing description, the contact detection section 1 specifies a portion or a region at or in which the robot contacts with the external world. On the other hand, where it is intended to estimate an external force acting upon a contacting portion which is determined in advance or is a predetermined position such as the origin of a link, a contact sensor need not always be disposed. In any robot apparatus to which the present invention is applied, whatever method is employed, only if an acting position of an external force is designated, the external force acting upon the acting position can be estimated. In other words, not a contact sensor is disposed to detect a point of action of an external force, but a point of action of an external force can be determined to estimate the external force applied to the position.

Further, the external force estimation method to which the present invention is applied can be configured so as to determine not only the "force" but also the "moment" as the external force. In particular, the external force estimation method is configured such that also a moment acts in place of a force in forward dynamics arithmetic operation represented by an expression given below. Further, as regards a component of an acceleration corresponding to the moment, the external force estimation method may be configured so as to calculate an angular acceleration in place of the translation acceleration.

$$\ddot{x} = FWD(q, \dot{q}, \tau, g, f)$$

Where the external force estimation method is configured in this manner, as regards a component of an external force f corresponding to a moment in the expression (9) given hereinabove, the moment can be estimated in accordance with a procedure basically same as that in the estimation of an external force described hereinabove through a modification that a unit external moment is applied in place of a unit external force.

Further, restricting conditions of a linear complementarity problem are not limited to such restricting conditions regarding the frictional force and the normal reaction force named in the examples described above, but more various restrictions can be handled depending upon the configuration of a linear complementarity problem solver.

While a preferred embodiment of the present invention has been described using specific terms, it is apparent that changes and variations may be made to the embodiment by those skilled in the art without departing from the spirit or scope of the following claims.

Although, in the present specification, a preferred embodiment wherein the present invention is applied to a legged mobile robot of the bipedal walking type has been described above, the subject matter of the present invention is not limited to this. The external force estimation method to which the present invention is applied basically does not rely upon the structure of a robot apparatus but can be applied to an arbitrary structure. In other words, according to the external force estimation method to which the present invention is applied, forward dynamics arithmetic operation can be incorporated in a form wherein it does not rely upon the structure and has a high degree of universal applicability.

The external force estimation method to which the present invention is applied can estimate a force acting upon an arbitrary place at which a contact sensor is disposed, different from an established method wherein a six-axis force sensor is used to detect a force acting upon an arbitrary local place. Accordingly, the external force estimation method to which the present invention is applied can be applied to various mechanical apparatus in which contact with the external world may occur at any place and is effective to grasp a situation of the contact.

In short, the present invention is disclosed for illustrative purposes, and the contents of description of the present specification shall not be interpreted restrictively. The scope of the invention, therefore, is to be determined solely by the following claims.

What is claimed is:

1. An external force estimation system for estimating an external force acting upon a robot apparatus which includes a machine body which in turn includes a plurality of movable joints, comprising:

distribution type contacting state detection means configured to detect a contacting state of an arbitrary portion of said machine body with the external world;

actuator current state measurement means configured to measure a position, a speed and a generation force at present of each of said joint actuators;

motion state measurement means configured to measure an acceleration and an angular speed at least at one portion of said machine body;

motion equation setting means configured to set a motion equation of said robot apparatus;

known term calculation means configured to calculate a known term of the motion equation from the current states of said joint actuators obtained from said actuator current state measurement means and the current state of said robot apparatus obtained from said motion state measurement means; and external force estimation means configured to estimate an acting state of the external force as an unknown term of the motion equation.

2. The external force estimation system according to claim 1, wherein said known term calculation means determines an operation space inertia inverse matrix and a bias acceleration by dynamics arithmetic operation in an operation space, and said external force estimation means estimates the acting state of the external force such that a relationship which satisfies the motion equation is established between the operation space inertial inverse matrix and the bias acceleration.

3. The external force estimation system according to claim 2, wherein said known term calculation means performs the operation space dynamics arithmetic operation using forward dynamics arithmetic operation.

4. The external force estimation system according to claim 2, wherein said external force estimation means forms a linear complementarity problem which is established between the acceleration and the external force and solves the problem to estimate the acting state of the external force.

5. The external force estimation system according to claim 2, wherein said motion state measurement means determines a posture and a position at the predetermined portion.

6. The external force estimation system according to claim 2, wherein said external force estimation means estimates the external force acting upon a portion whose contact with the external force is detected by said distribution type contacting state detection means.

7. The external force estimation system according to claim 2, wherein said external force estimation means estimates the external force regarding the acting direction obtained from an outer shape of the portion at which contact with the external world is detected by said distribution type contacting state detection means.

8. The external force estimation system according to claim 7, wherein said external force estimation means estimates a normal reaction force at the portion at which contact with the external world is detected by said distribution type contacting state detection means.

9. The external force estimation system according to claim 7, wherein said external force estimation means estimates a frictional force at the portion at which contact with the external world is detected by said distribution type contacting state detection means.

10. An external force estimation system for estimating an external force acting upon a robot apparatus which includes a machine body which in turn includes a plurality of movable joints, comprising:
   distribution type face contacting state detection means configured to detect a contacting state of an arbitrary region of said machine body with the external world;
   actuator current state measurement means configured to measure a position, a speed and a generation force at present of each of said joint actuators;
   motion state measurement means configured to measure an acceleration and an angular speed at least at one portion of said machine body;
   motion equation setting means configured to set a motion equation of said robot apparatus;
   known term calculation means configured to calculate a known term of the motion equation from the current states of said joint actuators obtained from said actuator current state measurement means and the current state of said robot apparatus obtained from said motion state measurement means; and
   external force estimation means configured to estimate the external force as an unknown term of the motion equation.

11. The external force estimation system according to claim 10, wherein said known term calculation means determines an operation space inertia inverse matrix and a bias acceleration by dynamics arithmetic operation in an operation space, and said external force estimation means estimates the external force such that a relationship which satisfies the motion equation is established between the operation space inertial inverse matrix and the bias acceleration.

12. The external force estimation system according to claim 11, wherein said known term calculation means performs the operation space dynamics arithmetic operation using forward dynamics arithmetic operation.

13. The external force estimation system according to claim 11, wherein said external force estimation means forms a linear complementarity problem which is established between the acceleration and the external force and solves the problem to estimate the acting state of the external force.

14. The external force estimation system according to claim 10, wherein said external force estimation means estimates an external force acting upon a point on an outer shape of a region whose contact with the external world is detected by said distribution type face contacting state detection means.

15. The external force estimation system according to claim 10, wherein said external force estimation means determines an external force acting upon each of vertices which form the outer shape of the region whose contact with the external world is detected by said distribution type face contacting state detection means, and estimates that the external force is applied to the position of the center of gravity of the outer shape.

16. An external force estimation system for estimating an external force acting upon a robot apparatus which includes a machine body which in turn includes a plurality of movable joints and has an acting point at which an external force acts, comprising:
   actuator current state measurement means configured to measure a position, a speed and a generation force at present of each of joint actuators;
   motion state measurement means configured to measure an acceleration and an angular speed at least at one portion of said machine body;
   motion equation setting means configured to set a motion equation of said robot apparatus at the acting point;
   known term calculation means configured to calculate a known term of the motion equation from the current states of said joint actuators obtained from said actuator current state measurement means and the current state of said robot apparatus obtained from said motion state measurement means; and
   external force estimation means configured to estimate the external force at the acting point as an unknown term of the motion equation.

17. An external force estimation method for estimating an external force acting upon a robot apparatus which includes a machine body which in turn includes a plurality of movable joints, comprising the steps of:
   detecting a contacting state of an arbitrary portion of said machine body with the external world;
   measuring a position, a speed and a generation force at present of each of said joint actuators;
   measuring an acceleration and an angular speed at least at one portion of said machine body;

setting a motion equation of said robot apparatus;
calculating a known term of the motion equation from the current states of said joint actuators obtained at the actuator current state measurement step and the current state of said robot apparatus obtained at the motion state measurement step; and
estimating an acting state of the external force as an unknown term of the motion equation.

18. The external force estimation method according to claim 17, wherein, at the known term calculation step, an operation space inertia inverse matrix and a bias acceleration are determined by dynamics arithmetic operation in an operation space, and at the external force estimation step, the acting state of the external force is estimated such that a relationship which satisfies the motion equation is established between the operation space inertial inverse matrix and the bias acceleration.

19. The external force estimation method according to claim 18, wherein, at the known term calculation step, the operation space dynamics arithmetic operation is performed using forward dynamics arithmetic operation.

20. The external force estimation method according to claim 18, wherein, at the external force estimation step, a linear complementarity problem which is established between the acceleration and the external force is formed, and is solved to estimate the acting state of the external force.

21. The external force estimation method according to claim 18, wherein, at the motion state measurement step, a posture and a position at the predetermined portion are determined.

22. The external force estimation method according to claim 18, wherein, at the external force estimation step, the external force acting upon a portion whose contact with the external force is detected at the distribution type contacting state detection step is estimated.

23. The external force estimation method according to claim 18, wherein, at the external force estimation step, the external force regarding the acting direction obtained from an outer shape of the portion at which contact with the external world is detected at the distributed type contacting state detection step is estimated.

24. The external force estimation method according to claim 23, wherein, at the external force estimation step, a normal reaction force at the portion at which contact with the external world is detected at the distribution type contacting state detection step is estimated.

25. The external force estimation method according to claim 23, wherein, at the external force estimation step, a frictional force at the portion at which contact with the external world is detected at the distribution type contacting state detection step is estimated.

26. An external force estimation method for estimating an external force acting upon a robot apparatus which includes a machine body which in turn includes a plurality of movable joints, comprising the steps of:
detecting a contacting state of an arbitrary region of said machine body with the external world;
measuring a position, a speed and a generation force at present of each of joint actuators;
measuring an acceleration and an angular speed at least at one portion of said machine body;
setting a motion equation of said robot apparatus;
calculating a known term of the motion equation from the current states of said joint actuators obtained at the actuator current state measurement step and the current state of said robot apparatus obtained at the motion state measurement step; and
estimating the external force as an unknown term of the motion equation.

27. The external force estimation method according to claim 26, wherein, at the external force estimation step, an external force acting upon a point on an outer shape of a region whose contact with the external world is detected at distribution type face contacting state detection step is estimated.

28. The external force estimation method according to claim 26, wherein, at the external force estimation step, an external force acting upon each of vertices which form the outer shape of the region whose contact with the external world is detected at the distribution type face contacting state detection step is determined, and it is estimated that the external force is applied to the position of the center of gravity of the outer shape.

29. An external force estimation method for estimating an external force acting upon a robot apparatus which includes a machine body which in turn includes a plurality of movable joints and has an acting point at which an external force acts, comprising the steps of:
measuring a position, a speed and a generation force at present of each of joint actuators;
measuring an acceleration and an angular speed at least at one portion of said machine body;
setting a motion equation of said robot apparatus at the acting point;
calculating a known term of the motion equation from the current states of said joint actuators obtained at the actuator current state measurement step and the current state of said robot apparatus obtained at the motion state measurement step; and
estimating the external force at the acting point as an unknown term of the motion equation.

30. A computer program described in a computer-readable form so as to execute, on a computer system, a process for estimating an external force acting upon a robot apparatus which includes a machine body which in turn includes a plurality of movable joints, said computer program causing said computer system to execute the steps of:
detecting a contacting state of an arbitrary portion of said machine body with the external world;
measuring a position, a speed and a generation force at present of each of said joint actuators;
measuring an acceleration and an angular speed at least at one portion of said machine body;
setting a motion equation of said robot apparatus;
calculating a known term of the motion equation from the current states of said joint actuators obtained at the actuator current state measurement step and the current state of said robot apparatus obtained at the motion state measurement step; and
estimating an acting state of the external force as an unknown term of the motion equation.

31. A computer program described in a computer-readable form so as to execute, on a computer system, a process for estimating an external force acting upon a robot apparatus which includes a machine body which in turn includes a plurality of movable joints, said computer program causing said computer system to execute the steps of:
detecting a contacting state of an arbitrary region of said machine body with the external world;
measuring a position, a speed and a generation force at present of each of joint actuators;

measuring an acceleration and an angular speed at least at one portion of said machine body;

setting a motion equation of said robot apparatus;

calculating a known term of the motion equation from the current states of said joint actuators obtained at the actuator current state measurement step and the current state of said robot apparatus obtained at the motion state measurement step; and estimating the external force as an unknown term of the motion equation.

32. A computer program described in a computer-readable form so as to execute, on a computer system, a process for estimating an external force acting upon a robot apparatus which includes a machine body which in turn includes a plurality of movable joints and has an acting point at which an external force acts, said computer program causing said computer system to execute the steps of:

measuring a position, a speed and a generation force at present of each of joint actuators;

measuring an acceleration and an angular speed at least at one portion of said machine body;

setting a motion equation of said robot apparatus at the acting point;

calculating a known term of the motion equation from the current states of said joint actuators obtained at the actuator current state measurement step and the current state of said robot apparatus obtained at the motion state measurement step; and estimating the external force at the acting point as an unknown term of the motion equation.

33. An external force estimation system for estimating an external force acting upon a robot apparatus which includes a machine body which in turn includes a plurality of movable joints, comprising:

a distribution type contacting state detection section configured to detect a contacting state of an arbitrary portion of said machine body with the external world;

an actuator current state measurement section configured to measure a position, a speed and a generation force at present of each of said joint actuators;

a motion state measurement section configured to measure an acceleration and an angular speed at least at one portion of said machine body;

a motion equation setting section configured to set a motion equation of said robot apparatus;

a known term calculation section configured to calculate a known term of the motion equation from the current states of said joint actuators obtained from said actuator current state measurement section and the current state of said robot apparatus obtained from said motion state measurement section; and an external force estimation section configured to estimate an acting state of the external force as an unknown term of the motion equation.

34. An external force estimation system for estimating an external force acting upon a robot apparatus which includes a machine body which in turn includes a plurality of movable joints, comprising:

a distribution type face contacting state detection section configured to detect a contacting state of an arbitrary region of said machine body with the external world;

an actuator current state measurement section configured to measure a position, a speed and a generation force at present of each of said joint actuators;

a motion state measurement section configured to measure an acceleration and an angular speed at least at one portion of said machine body;

a motion equation setting section configured to set a motion equation of said robot apparatus;

a known term calculation section configured to calculate a known term of the motion equation from the current states of said joint actuators obtained from said actuator current state measurement section and the current state of said robot apparatus obtained from said motion state measurement section; and an external force estimation section configured to estimate the external force as an unknown term of the motion equation.

35. An external force estimation system for estimating an external force acting upon a robot apparatus which includes a machine body which in turn includes a plurality of movable joints and has an acting point at which an external force acts, comprising:

an actuator current state measurement section configured to measure a position, a speed and a generation force at present of each of joint actuators;

a motion state measurement section configured to measure an acceleration and an angular speed at least at one portion of said machine body;

a motion equation setting section configured to set a motion equation of said robot apparatus at the acting point;

a known term calculation section configured to calculate a known term of the motion equation from the current states of said joint actuators obtained from said actuator current state measurement section and the current state of said robot apparatus obtained from said motion state measurement section; and an external force estimation section configured to estimate the external force at the acting point as an unknown term of the motion equation.

* * * * *